Feb. 7, 1933.         W. J. MORRILL         1,896,848
TWO-SPEED SINGLE PHASE MOTOR

Filed July 8, 1932

Inventor:
Wayne J. Morrill,
by Charles V. Tullar
His Attorney.

Patented Feb. 7, 1933

1,896,848

UNITED STATES PATENT OFFICE

WAYNE J. MORRILL, OF FORT WAYNE, INDIANA, ASSIGNOR TO GENERAL ELECTRIC COMPANY, A CORPORATION OF NEW YORK

TWO-SPEED SINGLE PHASE MOTOR

Application filed July 8, 1932. Serial No. 621,393.

My invention relates to variable speed single phase motors, and its object is to provide a simple arrangement whereby an ordinary split phase-start, single phase-run type of motor may be operated at two stable load operating speeds. In carrying my invention into effect, I purposely design the motor to have a pronounced torque dip in its normal single phase speed torque curve in the vicinity of the desired lower operating speed. Such low torque point can be produced, for example, at ½ full synchronous speed by providing a two-phase induction motor secondary or a secondary designed to produce a two-phase effect. Such a secondary induces low frequency voltages into the primary winding at half synchronous speed, and if corresponding low frequency currents are allowed to flow in the primary circuit, a torque develops which opposes the normal single phase torque and produces a torque dip or low torque point in the speed torque curve of the motor. A stable load operating range occurs just below the speed at which torque dip occurs. Then if it is desired to operate over the normal stable load operating range at the high speed, I may prevent the flow of the low frequency currents in the primary winding, as by inserting a frequency responsive impedance therein such as a suitable condenser which will pass the line frequency current but largely prevent the flow of low frequency currents. In certain cases such frequency responsive impedance means may also be used as the phase splitting device for starting purposes.

The features of my invention which are believed to be novel and patentable will be pointed out in the claims appended hereto. For a better understanding of my invention, reference is made in the following description to the accompanying drawing, wherein in Fig. 1 I have shown a preferred embodiment of my invention employing a condenser to prevent the flow of low frequency currents for high speed operation; and Fig. 2 represents the character of the speed torque curves which are thus obtainable.

Figure 1:
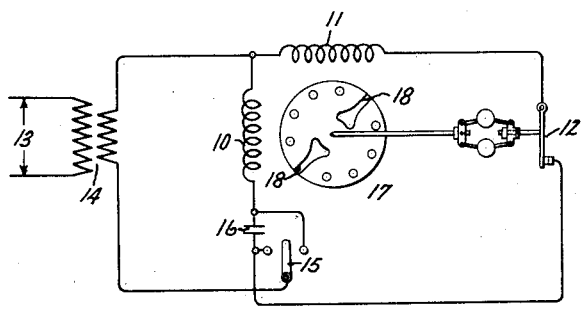
Figure 2:
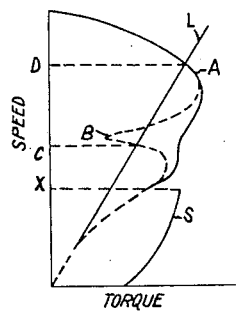

Referring to Fig. 1, I have here shown a single phase induction motor having the usual primary windings 10 and 11 displaced at an angle to each other. Winding 11 may be considered as the starting winding which is arranged to be cut out of circuit after the starting operation, as by a speed responsive switch represented at 12. The motor is here represented as being supplied from a source 13, through a distributing transformer 14. At 15, I have shown a line and speed selecting switch, and 16 represents a condenser which may be used both for the purpose of obtaining split phase starting and to prevent the flow of low frequency currents in the primary winding used for high speed operation.

The secondary 17 of the motor represented as the rotor element is of the squirrel cage type and differs from the usual squirrel cage rotor in that the end plates or rings of the squirrel cage winding are partially segregated at polar points as represented at 18, the representation being for a two pole motor. This gives the secondary characteristics approaching that obtainable with a two phase secondary winding, and, as is known, and heretofore avoided so far as possible, such a rotor will induce in the primary low frequency voltages which become pronounced at ½ synchronous speed. If not prevented, these low frequency voltages will cause the flow of low frequency currents in the primary winding circuit which find a return path through the distributing transformer, or, if no distributing transformer is used, through the supply generator, and cause a pronounced damping torque at ½ synchronous speed. This damping torque reduces the normal torque of the motor and causes a dip in the normal speed torque curve of the motor, such as is represented in the dotted line portion B of the single phase speed torque curve A in Fig. 2. However, if a suitable condenser 16 be inserted in the primary winding circuit of the motor, the low frequency currents will be largely suppressed without suppressing the normal line frequency current, and the half speed torque dip will not occur to any appreciable extent and the normal torque will be substantially unchanged. We may then represent the single phase torque of the motor as in the full line curve A, where only a very minor dip occurs at the ½ speed point.

If, now, we have a load requiring a torque at different speed represented by the line L, it will be seen that we will have a stable operating range at two materially different speeds, namely, at speeds C and D where the line L crosses the dotted line curve B just below the low torque point, and where it crosses the full line curve A above the highest torque point. The single phase torque is, of course, zero at the instant of starting, and it is necessary to energize both motor windings and introduce a phase split in some way for starting purposes. Curve S, Fig. 2, represents the starting torque thus obtained, and X the speed where the switch 12 opens and the motor operates single phase on winding 10.

In Fig. 1, I have provided a switching arrangement whereby the condenser 16 may be used in either winding 10 or 11 as the phase modifying device for split phase starting in either direction of rotation. The same switching device 15 serves as the line switch and speed selecting switch after the starting operation. The condenser 16 is thus here used in conjunction with switch 15 for a threefold purpose, namely, to obtain split phase starting, to select the direction of rotation, and to determine the load operating speed range after starting. On low speed operation the condenser also has a beneficial effect upon the power factor of the motor. If the switch 15 be closed to the right the motor will start in one direction with condenser 16 in winding 11. After switch 12 opens, winding 10 will be connected directly across the line and we will obtain the low speed operating range corresponding to speed C, because now low frequency currents can flow in the primary winding 10. If we wish to operate at the high speed in the same direction of rotation, switch 15 is thrown to the left-hand contact to include the condenser 16 in the circuit of winding 10 after the starting operation. If in starting we wish to have the motor rotate in the opposite direction, switch 15 is closed to the left, which reverses the direction of phase shift in the two displaced windings. After the starting switch 12 opens, the motor will operate high speed, since the condenser is in circuit with winding 10, and we may now go to low speed in this new direction of rotation by opening switch 15 until the speed drops somewhere between points B and X, and then closing it again without going through the starting operation. It will thus be seen that we may operate the motor in either direction of rotation at either operating speed, and we may change from one operating speed to the other at will without going through the starting operation. The above manner of operation assumes that the two windings 10 and 11 are alike. In some cases it may be desirable to make the windings unlike, to obtain a somewhat different relation between starting torque and single phase running torque, particularly where operation in only one direction is required. In other cases it may become desirable to use a different phase modifying device than condenser 16 for starting purposes.

The main novel feature of the invention is to provide a motor having a torque dip in its normal single phase speed torque curve, and to provide means for substantially eliminating such torque dip as desired to obtain different stable operating speeds, and I do not wish to confine the application of this principle to any particular starting arrangement or motor design.

What I claim as new and desire to secure by Letters Patent of the United States, is:—

1. A variable speed single phase motor having a primary winding and a secondary member, said secondary member being designed to induce low frequency voltages in the primary winding at a fraction of the maximum speed of the motor, means for substantially preventing the flow of corresponding low frequency currents in the primary winding without materially preventing the flow of normal frequency currents therein, and means for eliminating the effect of said preventing means.

2. An alternating current motor having a primary winding, a supply circuit therefor, a secondary member for said motor designed to induce low frequency voltages in the primary winding at a fraction of the maximum speed of the motor, a frequency responsive impedance, and means for inserting said frequency responsive impedance in and removing it from the primary winding circuit to vary the speed of the motor.

3. An alternating current motor having a primary winding, an alternating current supply circuit therefor, a secondary member for said motor designed to induce voltages into the primary winding at a fraction of the maximum speed of the motor which have a frequency appreciably below the frequency of said alternating current supply, frequency responsive impedance means, and means for including said impedance in and excluding it from the primary winding circuit to vary the motor operating speed.

4. A single phase alternating current motor having a primary winding, an alternating current supply circuit therefor, an induction motor secondary member for said secondary having a squirrel cage segregated to produce the effect of a two-phase secondary winding, a condenser, and means for inserting said condenser in and excluding it from the primary winding circuit to vary the operating speed of the motor.

5. A single phase motor having two primary windings displaced at an angle to each other, a condenser, speed responsive switching means for connecting said windings in parallel circuits with the condenser in series with one of them for split phase starting purposes and then automatically opening one of the winding circuits for single phase running, a secondary for said motor designed to induce low frequency currents in the winding used for running at a fraction of the full operating speed of the motor, and manual means for switching said condenser into and out of circuit with the winding used for running to vary the motor operating speed.

6. A two-speed, reversible, single phase motor having two primary windings displaced at an angle to each other, a condenser, a speed responsive switch in series with one of said windings, said switch being closed during the starting operation only, a manual switch for connecting said windings in parallel circuits with the condenser in series with either of them to determine the direction of rotation at start, an induction motor secondary for said motor designed to produce a two-phase effect and induce low frequency voltages in the running primary winding at one-half full synchronous speed to obtain a low operating speed, said condenser being employed during high speed operation to substantially prevent the flow of low frequency currents in the running winding.

In testimony whereof, I have hereunto set my hand.

WAYNE J. MORRILL.